United States Patent
Zwart (10) Patent No.: US 9,946,672 B2
(45) Date of Patent: Apr. 17, 2018

(54) TRANSFER FOR CONTROL DATA OVER HALF-DUPLEX LINK

(71) Applicant: Cirrus Logic International Semiconductor Ltd., Edinburgh (GB)

(72) Inventor: Willem Zwart, Edinburgh (GB)

(73) Assignee: Cirrus Logic, Inc., Austin, TX (US)

( * ) Notice: Subject to any disclaimer, the term of this patent is extended or adjusted under 35 U.S.C. 154(b) by 223 days.

(21) Appl. No.: 14/838,888

(22) Filed: Aug. 28, 2015

(65) Prior Publication Data

US 2017/0060794 A1 Mar. 2, 2017

(51) Int. Cl.
*G06F 13/00* (2006.01)
*G06F 13/36* (2006.01)
(Continued)

(52) U.S. Cl.
CPC ............ *G06F 13/36* (2013.01); *G06F 13/405* (2013.01); *G06F 13/4068* (2013.01); *G06F 13/4256* (2013.01)

(58) Field of Classification Search
None
See application file for complete search history.

(56) References Cited

U.S. PATENT DOCUMENTS 8,416,750 B1 * 4/2013 Vargantwar ....... H04W 72/1242
370/329
2003/0026296 A1 2/2003 Ngo
(Continued)

FOREIGN PATENT DOCUMENTS

EP 0525221 A1 2/1993
WO 2003053079 A1 6/2003

OTHER PUBLICATIONS

International Search Report and Written Opinion of the International Searching Authority, International Application No. PCT/GB2016/052643, dated Nov. 24, 2016.
(Continued)

*Primary Examiner* — Idriss N Alrobaye
*Assistant Examiner* — Richard B Franklin
(74) *Attorney, Agent, or Firm* — Jackson Walker L.L.P.

(57) ABSTRACT

A method of transferring control data between a master device and a slave device over a path including at least one intermediate device, such that the path includes multiple path segments between successive pairs of devices. Data is transferred on each path segment in a plurality of frames of data, wherein the frames are synchronized between said path segments. The control data is transmitted in command slots of each frame, wherein a command slot comprises a set of control data bit slots, and wherein a control data bit slot is a time window associated with the transfer of a single control data bit over a single path segment between the devices on the path segment. The control data bit slots for each command slot are subdivided into: a first set of bit slots reserved for the transfer of control data in the direction from the master device to the slave device, and a second set of bit slots reserved for the transfer of control data either in the direction from the master device to the slave device or in the direction from the slave device to the master device. The time positions of the command slots on each path segment are offset from the positions of the command slots on each respective adjacent path segment by at least one control data bit slot.

17 Claims, 9 Drawing Sheets

(51) Int. Cl.
    *G06F 13/40*     (2006.01)
    *G06F 13/42*     (2006.01)

(56) References Cited

U.S. PATENT DOCUMENTS

2012/0076319 A1    3/2012   Terwal
2012/0243559 A1    9/2012   Pan et al.
2014/0101351 A1    4/2014   Hooper et al.
2016/0065353 A1    3/2016   Huang et al.

OTHER PUBLICATIONS

Search Report under Section 17, Application No. GB1519846.8, dated Apr. 29, 2016, 4 pages.

\* cited by examiner

TRANSFER FOR CONTROL DATA OVER HALF-DUPLEX LINK

This invention relates to the transfer of control data over a half-duplex link.

In a half-duplex wired communications interface, digital data is sent between a master and a slave. In some specific uses, this data is isochronous, for example audio data.

In a practical implementation of such a communications interface, the isochronous data is complemented with control data. This control data requires asynchronous data transactions between master and slave. The nature of these asynchronous transactions is that they are irregular and may implement various types of data transactions, such as remote register read and write operations, and status updates, but also the transfer of relatively large sets of data. The typical purpose of these asynchronous data transactions is the configuration and control of the application that produces and consumes the isochronous data streams.

A specific challenge arises when a fabric comprising multiple of these communications interfaces is used to interconnect a multitude of devices, such as inside a device such as a PC, or when connecting multiple audio functions such as ear buds, a pod and an audio connector. In such a fabric, it is advantageous in some ways for each segment of the fabric to consist of an interface with one master and one slave.

This means that, when connecting multiple devices, there is a necessity to introduce repeaters and switches. There is the desire to control an ultimate slave device directly from a primary master device, with the role of the switches and repeaters being only to pass through the commands in the required direction. Hence a simple set of rules is adequate to define the behaviour of these devices.

When such a fabric is used to support the distribution of audio data, there is an advantage if all slaves operate on the same timing as the primary master, and specifically if they use a frame rate and phase imposed by the primary master. It can also be assumed that there is some latency associated with switches and repeaters, and therefore there will typically be a minimum delay of one frame period between transporting data on consecutive segments.

It should also be noted that some of the control transactions, such as a register read on a slave device requires communications in both directions. First, the master indicates that it wants to read from a specific slave at a specific register address, and then the slave responds with the actual data.

In some examples, the control data is sent in command slots, which are located within control frames. As mentioned above, the control frames are synchronized in each device. If the command slots are also synchronized with each other, then the latency associated with switches and repeaters means that passing control data over multiple segments involves a latency that is at least equal to the number of segments multiplied by the duration of a command slot.

According to a first aspect of the invention, there is provided a method of transferring control data between a master device and a slave device over a path including at least one intermediate device, such that the path includes multiple path segments between successive pairs of devices, the method comprising:
transferring data on each path segment in a plurality of frames of data, wherein the frames are synchronized between said path segments;
transmitting the control data in command slots of each frame, wherein a command slot comprises a set of control data bit slots, and wherein a control data bit slot is a time window associated with the transfer of a single control data bit over a single path segment between the devices on the path segment;
wherein the control data bit slots for each command slot are subdivided into:
a first set of bit slots reserved for the transfer of control data in the direction from the master device to the slave device, and
a second set of bit slots reserved for the transfer of control data either in the direction from the master device to the slave device or in the direction from the slave device to the master device; and
wherein the time positions of the command slots on each path segment are offset from the positions of the command slots on each respective adjacent path segment by at least one control data bit slot.

According to a first aspect of the invention, there is provided a system, comprising a master device and a slave device connected by a path including at least one intermediate device, such that the path includes multiple path segments between successive pairs of devices, the system being adapted to transfer control data between the master device and the slave device by:
transferring data on each path segment in a plurality of frames of data, wherein the frames are synchronized between said path segments;
transmitting the control data in command slots of each frame, wherein a command slot comprises a set of control data bit slots, and wherein a control data bit slot is a time window associated with the transfer of a single control data bit over a single path segment between the devices on the path segment;
wherein the control data bit slots for each command slot are subdivided into:
a first set of bit slots reserved for the transfer of control data in the direction from the master device to the slave device, and
a second set of bit slots reserved for the transfer of control data either in the direction from the master device to the slave device or in the direction from the slave device to the master device; and
wherein the time positions of the command slots on each path segment are offset from the positions of the command slots on each respective adjacent path segment by at least one control data bit slot.

According to a first aspect of the invention, there is provided an intermediate device, for transferring control data between a master device and a slave device over a path including at least one such intermediate device, such that the path includes multiple path segments between successive pairs of devices, wherein:
data is transferred on each path segment in a plurality of frames of data, wherein the frames are synchronized between said path segments;
the control data is transmitted in command slots of each frame, wherein a command slot comprises a set of control data bit slots, and wherein a control data bit slot is a time window associated with the transfer of a single control data bit over a single path segment between the devices on the path segment; and
wherein the control data bit slots for each command slot are subdivided into:
a first set of bit slots reserved for the transfer of control data in the direction from the master device to the slave device, and a second set of bit slots reserved for the transfer of control data either in the direction from the master device to the slave device or in the direction from the slave device to the master device;

the device comprising first and second interfaces for connection to respective first and second path segments, configured such that the respective time positions of the command slots on the first and second path segments are offset from each other by at least one control data bit slot.

This has the advantage that passing control data over multiple segments involves a lower latency than if the command slots were synchronized with each other.

For a better understanding of the present invention, and to show how it may be put into effect, reference will now be made, by way of example, to the accompanying drawings, in which:—

Figure 1:
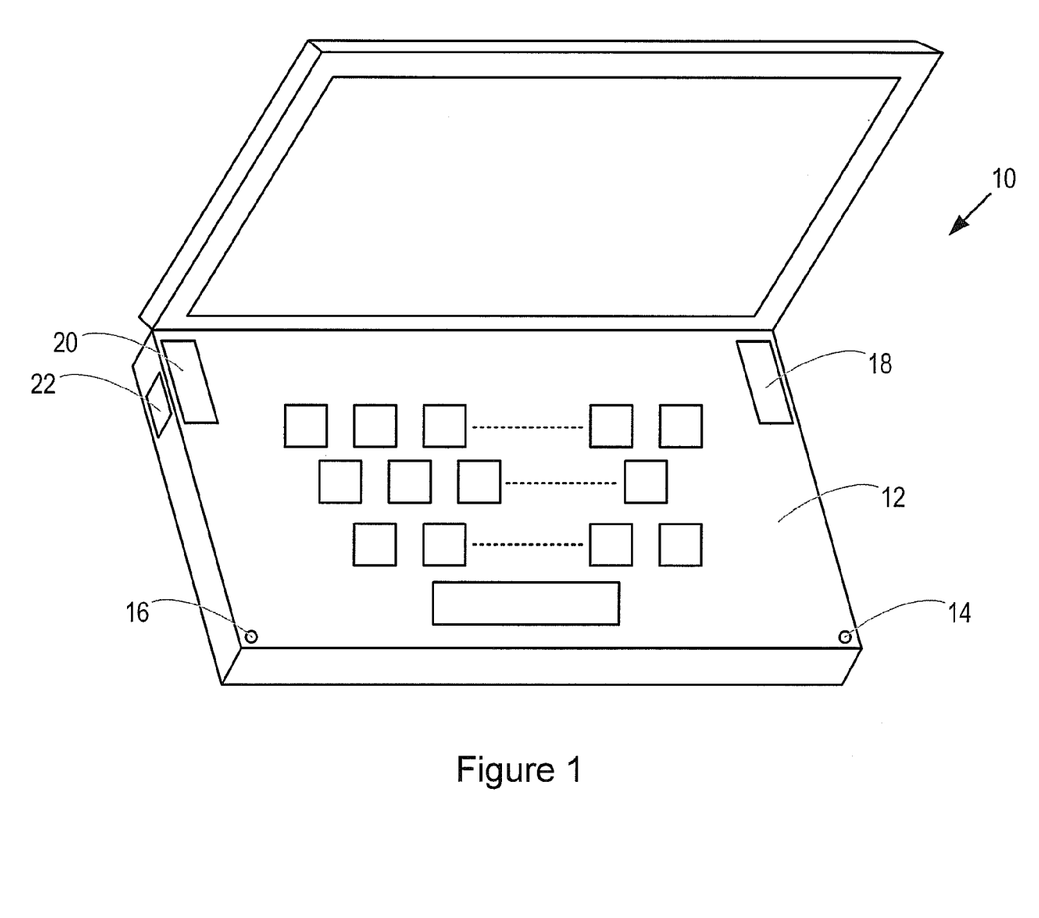
FIG. 1 illustrates an audio device.

FIG. 1 illustrates a laptop computer 10, as an example of a product including an audio system operating in accordance with the methods described herein.

The laptop computer 10 has an upper internal surface 12, which includes a keyboard. The surface 12 also includes sound inlet apertures 14, 16 that allow external sounds to be picked up by microphones within the body of the laptop computer 10. The surface 12 also includes sound outlet apertures 18, 20 that allow the egress of sounds generated by loudspeakers within the body of the laptop computer 10. The laptop computer 10 also includes at least one inlet/outlet port 22 for receiving a removable connector that can also be used to transmit or receive audio data. For example, the port 22 can be a socket for receiving a 3.5 mm audio jack, or can be a USB-C socket, allowing a headset or other device to be connected to the laptop computer 10.

Although the laptop computer 10 is illustrated by way of an example, it will be appreciated that the system described herein can be used in any suitable product, such as notebook or tablet computers, smartphones, games consoles, television sets, in-car entertainment systems, home cinema systems, or the like.

Figure 2A:
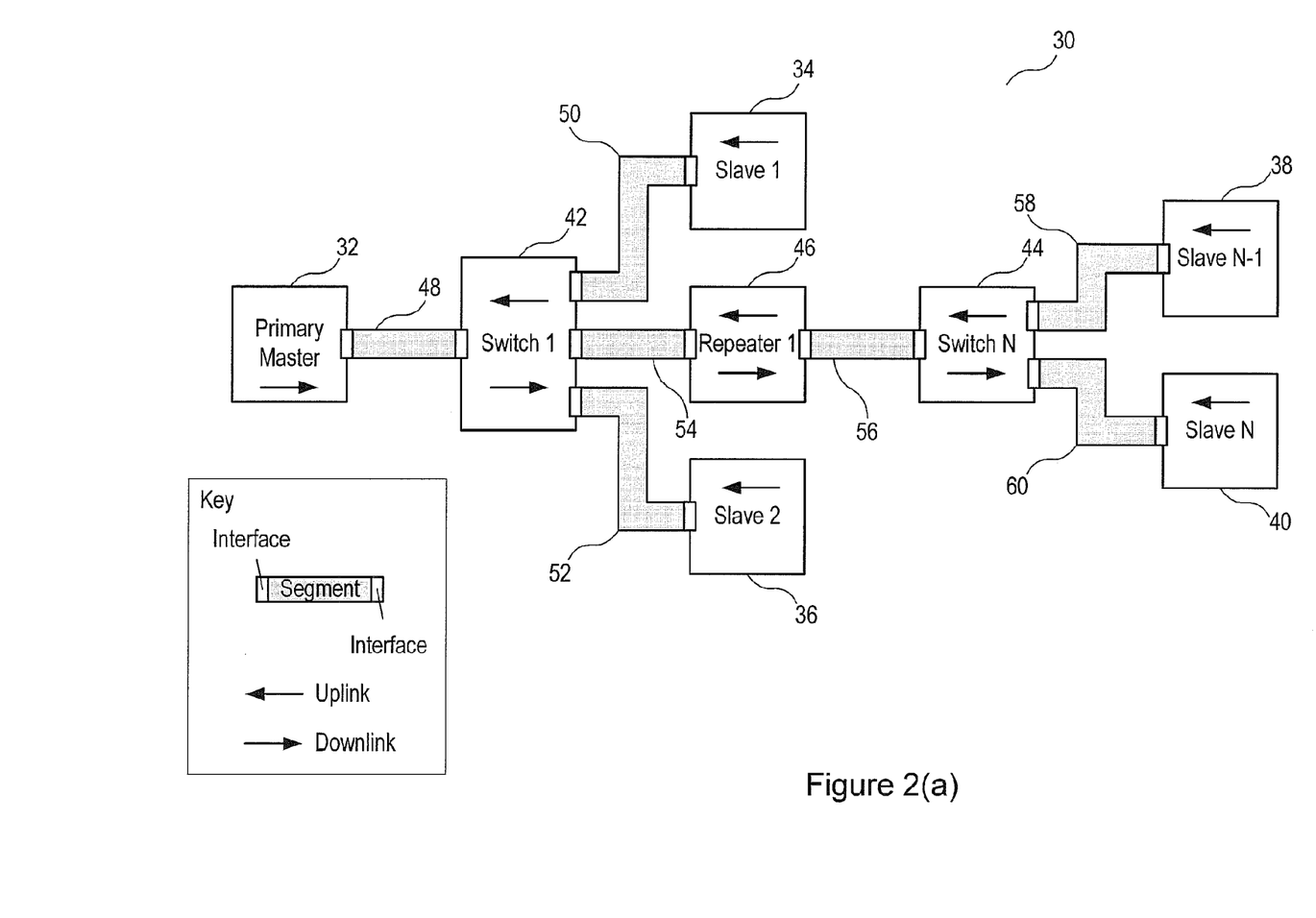
FIGS. 2(a), 2(b), 2(c), 2(d) and 2(e) illustrate a communications fabric in the device of FIG. 1.

FIG. 2(a) illustrates the audio communications fabric 30 in a product of the type shown in FIG. 1. Specifically, as shown in FIG. 2(a), there is one device 32 that acts as a primary master for controlling the audio communications fabric 30. For example, the device 32 may be an audio codec device.

The audio communications fabric 30 also includes multiple slave devices 34, 36, 38, 40. As in the example shown in FIG. 1, the slave devices may be microphone modules, speaker modules, or the like. The master device 32 and slave devices 34, 36, 38, 40 each include respective communications interfaces for connecting to a physical medium, which may for example be a single wire or a pair of wires, to communicate with other devices in the product, allowing the exchange of binary data between them. Thus, the master device 32 includes an interface that performs a master role during communications, while the slave devices 34, 36, 38, 40 each include respective interfaces that perform a slave role during communications.

The fabric 30 is such that the respective connections, i.e. paths, between the primary master device 32 and the slave devices 34, 36, 38, 40 are divided into segments, i.e. path segments, with each segment having only one master and one slave. Thus, to deal with the presence of multiple slaves such as the slaves 34, 36, 38, 40, the example fabric 30 is provided with two switches 42, 44.

In addition, in order to deal with the fact that the electrical connections, i.e. cables, between certain slaves and the primary master may be relatively long, the example fabric 30 is provided with a repeater 46.

Each switch, such as the switches 42, 44, has one uplink connection and multiple downlink connections, while each repeater, such as the repeater 46, has one uplink connection and one downlink connection. Thus, each switch acts as a repeater with a selectable output.

Figure 2B:
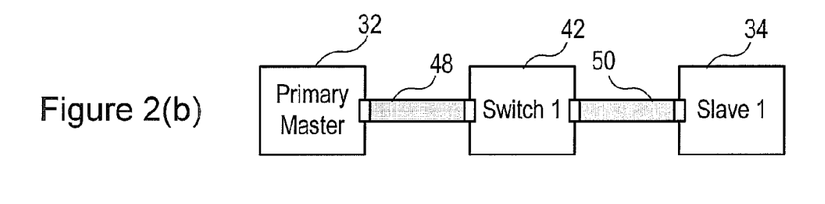

Thus, as shown in FIG. 2(b), the path between the primary master 32 and the slave device 34 passes over a path segment 48, switch 42, and path segment 50.

Figure 2C:
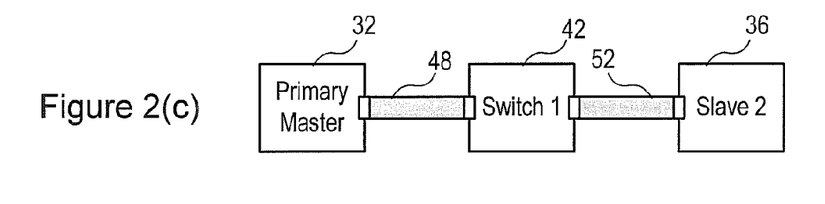

As shown in FIG. 2(c), the path between the primary master 32 and the slave device 36 passes over the path segment 48, switch 42, and path segment 52.

Figure 2D:
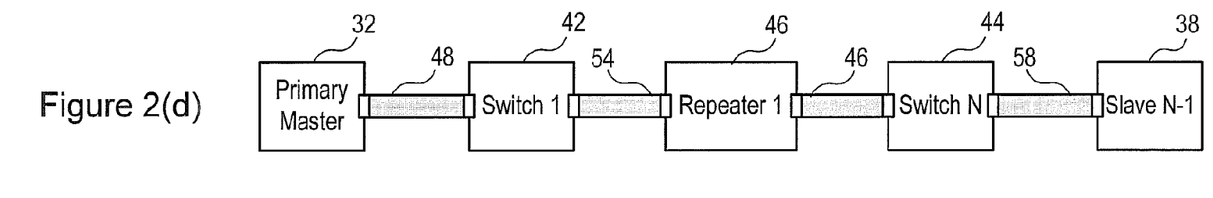

As shown in FIG. 2(d), the path between the primary master 32 and the slave device 38 passes over the path segment 48, switch 42, path segment 54, repeater 46, path segment 56, switch 44 and path segment 58.

Figure 2E:
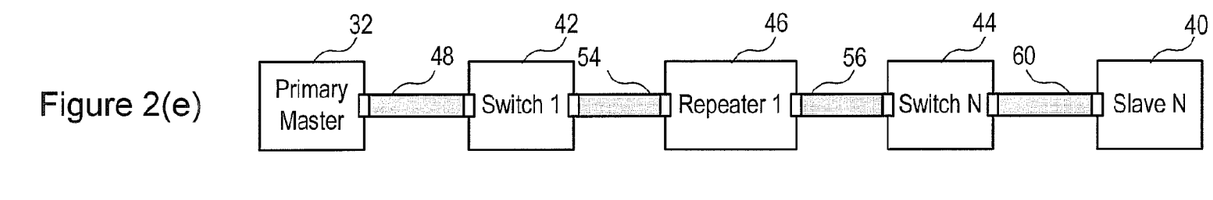

As shown in FIG. 2(e), the path between the primary master 32 and the slave device 40 passes over the path segment 48, switch 42, path segment 54, repeater 46, path segment 56, switch 44 and path segment 60.

In these examples, each path segment comprises a medium that physically connects multiple communications interfaces, with one communications interface performing a master role and one communications interface performing a slave role. The fabric 30 then comprises the set of path segments and the devices interconnected by them.

Thus, in each case, the path between the master device and the slave device includes at least one intermediate device (such as the switches 42, 44 and the repeater 46), and is divided into path segments between each successive pair of devices. Each intermediate device includes one communications interface that performs a master role and one or more communications interfaces that perform a slave role.

Data is transmitted bi-directionally on each path segment in frames, with each frame being divided into multiple rows. Thus, a frame consists of a repetitive sequence of bit slots, where a bit slot is a time window during which the communications interface can transfer a single bit, and where a bit can be regarded as an atomic unit of information. In the frame, specific bit slots have specific functions as mutually understood by the master and slave devices connected by the path segment.

Figure 3:
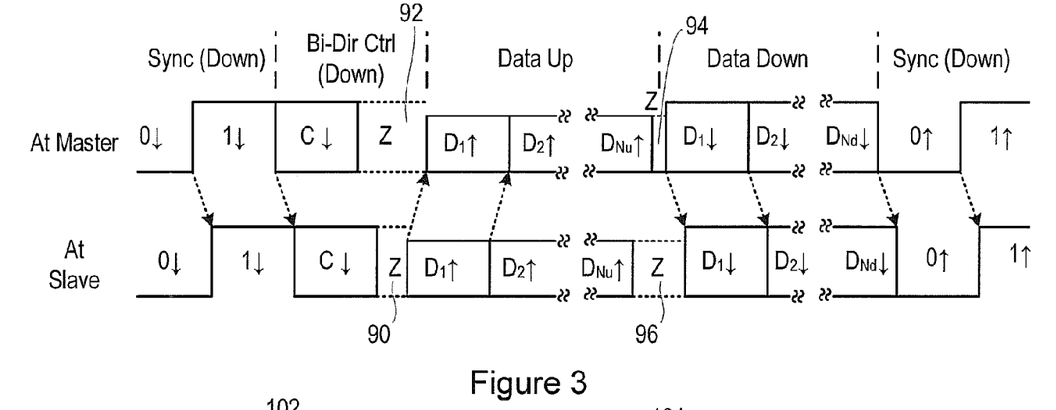
FIGS. 3 and 4 illustrate the structure of one row of transmitted data.

FIG. 3 shows an example of the data transfer in one row of a frame. In this example, each row contains bits that are reserved for:

transmitting synchronization data from the master to the slave (i.e. "down");

transmitting isochronous data (for example audio data) from the master to the slave;

transmitting isochronous data from the slave to the master (i.e. "up"); and transmitting asynchronous control data, either from the master to the slave, or from the slave to the master.

Control data is data flowing between devices on the fabric, required for the operation of the communications interface and other miscellaneous functions on the respective devices. Control data is made up of control data bits, which are the atomic units of information in the control data.

A control data bit slot is a time window during which the communications interface can transfer a single control data bit, and a control frame is the subset of the frame grouping together all the control data bit slots of the frame.

In this example, the sequence is that each row contains two sync symbols, transmitted from the master to the slave, then a control symbol which may be transmitted in either direction, then a series of data symbols D1, D2, . . . , DNu transmitted from the slave to the master, and a series of data symbols D1, D2, . . . , DNd transmitted from the master to the slave. A transmission delay applies to transmissions in both directions. Symbols transmitted from the slave to the master are illustrated with slightly lower heights than symbols transmitted from the master to the slave, but this is simply for illustrative purposes and has no physical meaning.

Specifically, FIG. 3 illustrates the case in which the bidirectional control data bit slot is allocated for transmission of control data from the master to the slave. In this case, the slave receives the control symbol, and then transmits the first data up symbol after a delay indicated by the reference numeral 90. Because of the transmission delays in both directions and the delay 90 within the slave, there is a delay indicated by the reference numeral 92 between the time at which the master transmits the control symbol and the time at which the master receives the first data up symbol. During this delay 92, the master device enters a high impedance state Z, during which there is no observable effect at the master device of either device driving the wire. Similarly, during the delay 90, the slave device enters a high impedance state Z, during which there is no observable effect at the slave device of either device driving the wire.

Data from the master to the slave is transmitted synchronous to a master symbol transmission clock (not illustrated) corresponding to a symbol period. Thus when the direction of data transfer is reversed again, the first data symbol down is not transmitted until a whole number of symbol periods since the previous symbol transmitted down (in this case the control symbol sent just prior to delay 92). Thus there is a further delay 94 between when the master receives the last data up symbol and when it transmits the first data down symbol. Because of the transmission delays, i.e. latency, in both directions and this additional delay 94, there is a delay indicated by the reference numeral 96 between the time at which the slave transmits the last data up symbol and the time at which the slave receives the first data down symbol. During the delay 94, the master device enters a high impedance state Z, during which there is no observable effect at the master device of either device driving the wire. Similarly, during the delay 96, the slave device enters a high impedance state Z, during which there is no observable effect at the slave device of either device driving the wire.

Thus, there is a delay at each device when the direction of data flow is changed. The two delays 92, 94 seen at the master device have the same total length as the two delays 90, 96 seen at the slave device. In this example, these two delays, in each case, total one symbol period tsymbol. Because there are only two such reversals of the data transfer direction in each frame, the total time associated with the transmission delay is advantageously smaller than it would be with more direction changes.

Figure 4:
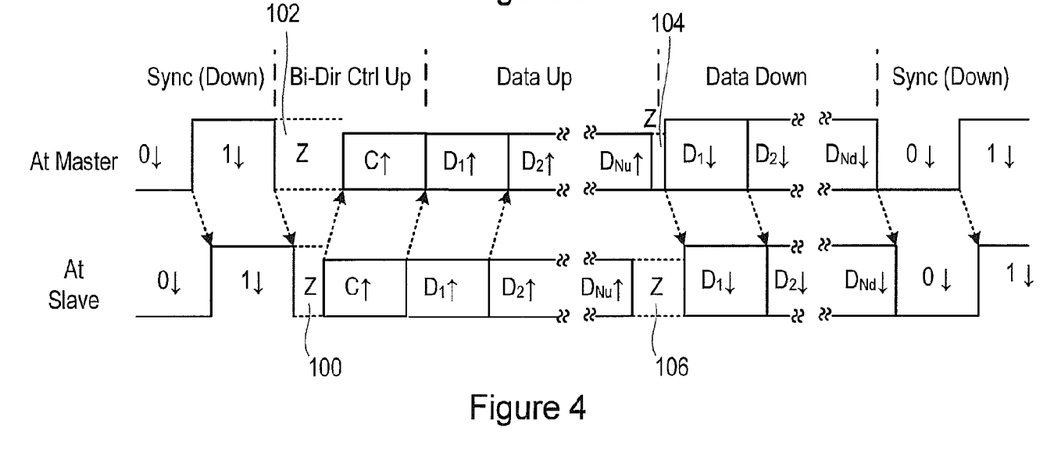

FIG. 4 illustrates another example of the timing, with the same frame structure as in FIG. 3, but in the case in which the bidirectional control data bit slot is allocated for transmission of control data from the slave to the master.

In this case, the slave receives the second sync symbol, and then transmits the control data symbol after a delay indicated by the reference numeral 100. Because of the transmission delays in both directions and the delay 100 internal to the slave, there is a delay indicated by the reference numeral 102 between the time at which the master transmits the second sync symbol and the time at which the master receives the control symbol.

There is in this case no need for a delay between the transmission of the control symbol and the first data up symbol. There is a further delay only when the direction of data transfer is reversed, That is, when the master receives the last data up symbol, it transmits the first data down symbol after a delay indicated by the reference numeral 104 due to waiting for the next edge of the master symbol transmission clock. Because of the transmission delays in both directions and this delay 104, there is a delay indicated by the reference numeral 106 between the time at which the slave transmits the last data up symbol and the time at which the slave receives the first data down symbol.

Again, there is a delay at each device when the direction of data flow is changed, and there are only two such direction changes in each frame, even though the control symbol is in the opposite direction to that shown in FIG. 3. The two delays 102, 104 seen at the master device have the same total length as the two delays 100, 106 seen at the slave device. Again, these two delays, in each case, total one symbol period tsymbol. As before, during the delays 102, 104, the master device enters a high impedance state Z, during which there is no observable effect at the master device of either device driving the wire. Similarly, during the delays 100, 106, the slave device enters a high impedance state Z, during which there is no observable effect at the slave device of either device driving the wire.

This ensures that a maximally large portion of the period of each row can be used effectively for transferring data, inherently optimizing the number of data symbols that can be transferred per unit of time, given the constraints for latency and the required overhead to synchronize two devices on either side of the interface. As a consequence of the ordering of the symbol slots as described, the direction of the data in the control symbol has no impact on the maximal number of data symbols that can be transferred per unit of time.

Thus, on each respective path segment, there will be a slight time offset between the timing of the row as seen from the master device and as seen from the slave device. However, with the exception of this slight time offset, each of the devices will be time synchronized.

Figure 5:
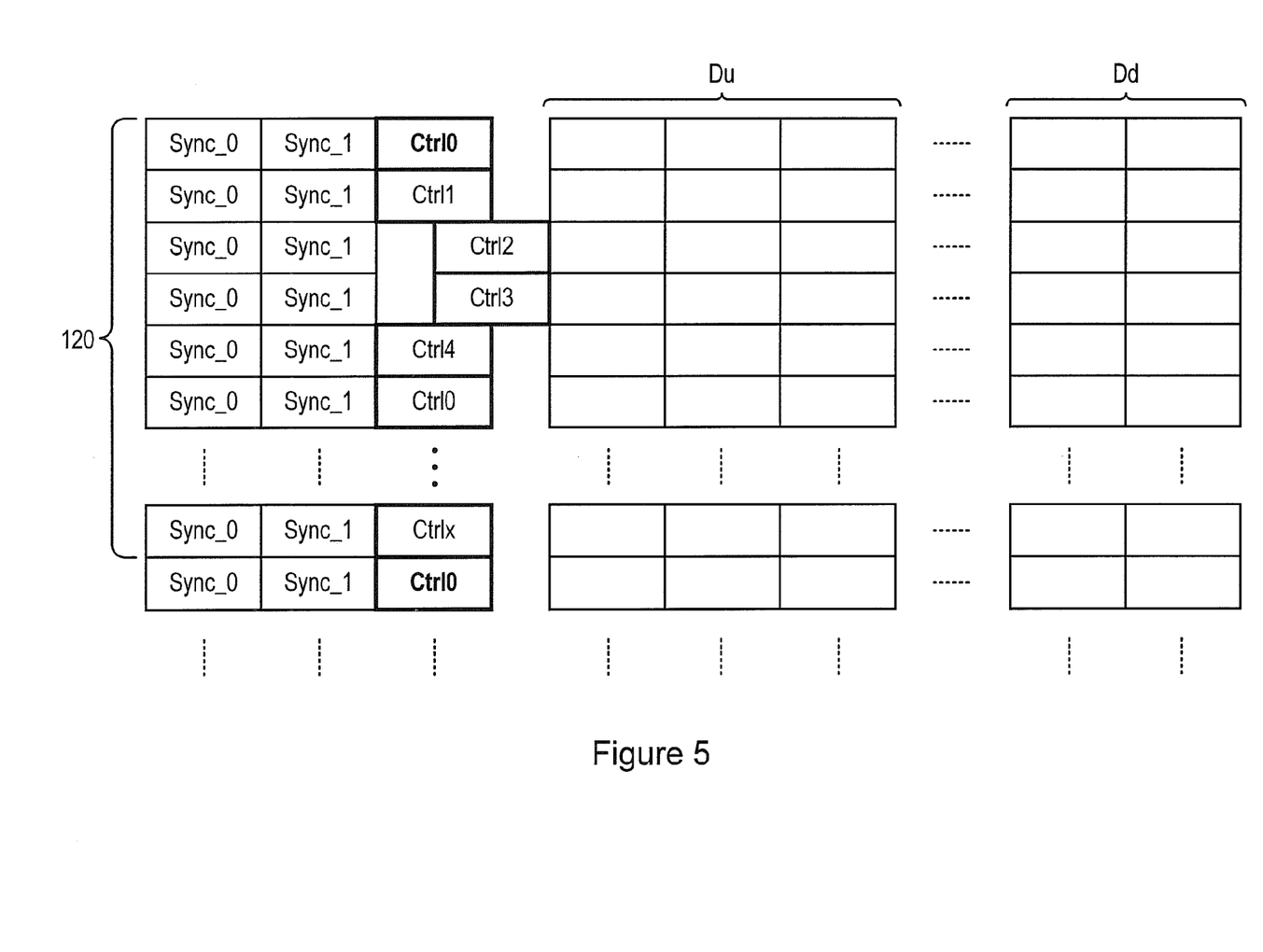
FIGS. 5 and 6 illustrate example frame structures.

FIG. 5 shows the structure of a frame 120, in one example. The frame contains multiple rows, numbered 0, 1, 2, . . . , n, . . . x. In this example, as described with reference to FIG. 3, each row of the frame contains two sync symbols, Sync_0 and Sync_1, transmitted from the master to the slave, then a control symbol, Ctrln, which may be transmitted in either direction, then a series of data symbols Du transmitted from the slave to the master, and a series of data symbols Dd transmitted from the master to the slave.

As mentioned above, the control symbol can be transmitted either from the master to the slave, immediately after the synchronization bits, or from the slave to the master, immediately before the data symbols Du.

Figure 6:
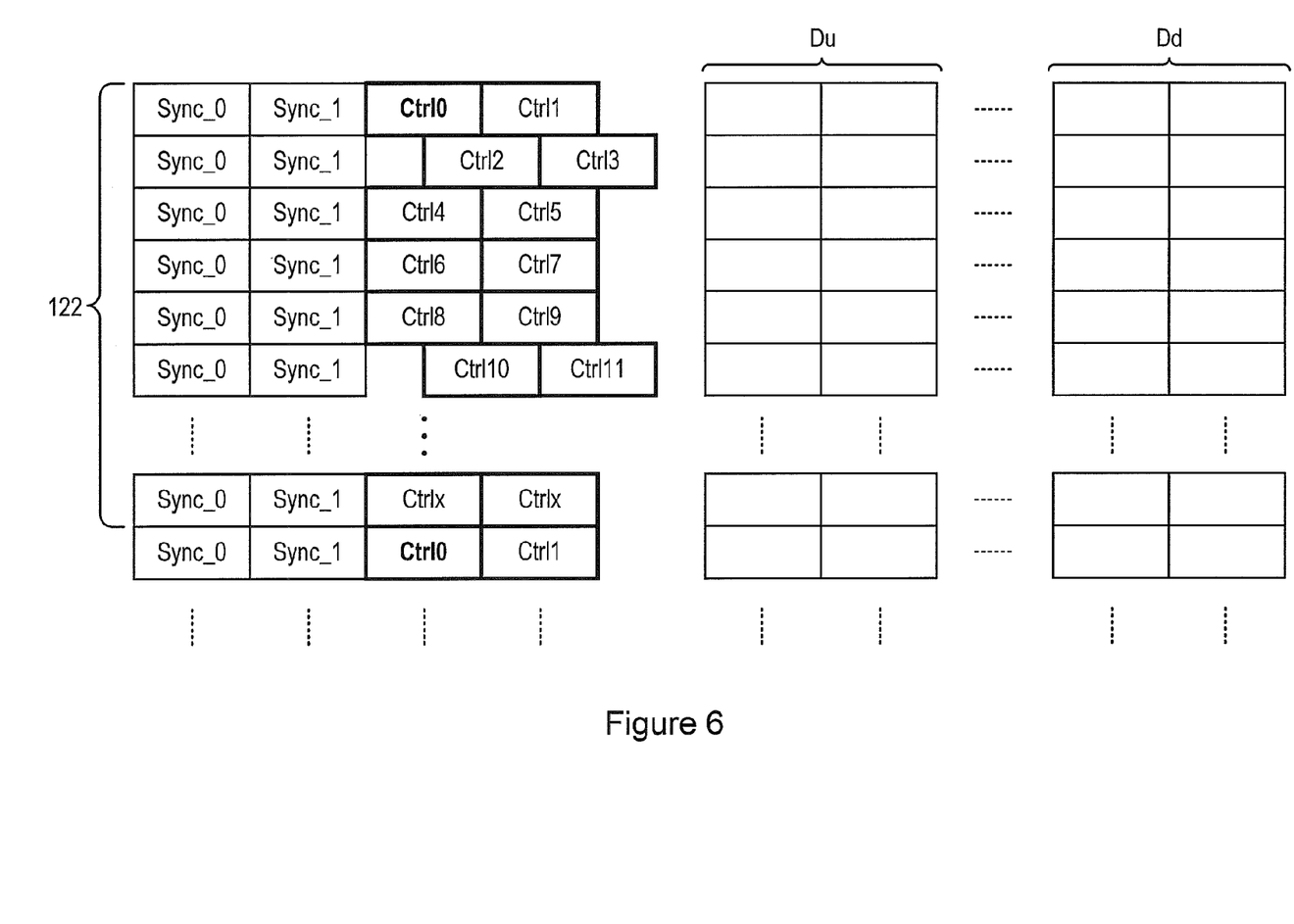

FIG. 6 shows an alternative frame structure 122 by way of another example.

Again, the frame contains multiple rows. In this example, each row of the frame contains two sync symbols, Sync_0 and Sync_1, transmitted from the master to the slave, then two control symbols, which may be transmitted in either direction, then a series of data symbols Du transmitted from the slave to the master, and a series of data symbols Dd transmitted from the master to the slave.

As before, the control symbols can be transmitted either from the master to the slave, immediately after the synchronization bits, or from the slave to the master, immediately before the data symbols Du. FIG. 6 shows two control symbols in each row, but there may be any convenient number of control symbols per row, depending on the anticipated need for control data transmissions.

In any of these example frame structures, the control symbols in each frame are combined to form a control frame.

The control data takes the form of asynchronous data transactions between the master and the slave. The nature of these asynchronous transactions is that they are irregular and may implement various types of data transactions, such as remote register read and write operations, interrupt polls, and status updates. There are also transactions of relatively large sets of data. There is no timing relation between the control data transactions and the isochronous data streams. The typical purpose of these asynchronous data transactions is the configuration and control of the application that produces and consumes these isochronous data streams.

In these examples, each control frame is divided into command slots and other control slots. For example, in a case where there are 128 rows per frame, and one control symbol per row, there are 128 control symbols in each control frame. These 128 control symbols may for example be divided into six command slots, each of 18 bits, 14 synchronization bits that are used to indicate the start position of the control frame, and 6 status bits that are used to indicate the status of the master device.

In this example, each of the command slots comprises a 2-bit Opcode that is transmitted by the master device plus a 16-bit parameter that can be transmitted either by the master or by the slave.

For example, a typical set of Opcodes may encode the following four Commands:

HEADER Indicating that the parameter that follows is part of the header. The header encodes the nature of the transaction. It is quite possible that the header comprises the parameters of several command slots, such as the logic address of the slave device on the fabric, the register address inside the addressed slave device, the direction of the data flow of the transaction and the length of the data transaction. It may also encode several basic types of transaction, such as an Interrupt or a Poll;

DATA Indicating that the parameter that follows is the actual data that is being transferred as part of the transaction;

ACK Indicating that the Master requests an Acknowledgment on the correct reception by the slave of the preceding data stream; and CRC Indicating that the concluding parameter or return value contains the Cyclic Redundancy Check (CRC) over the preceding transaction.

Thus, for example, a basic operation might be that a master device wishes to send a command to a slave device, so that the slave device returns some data to the master device.

However, more complex sequences can be achieved by concatenating commands, and propagating control data bi-directionally.

Figure 7:
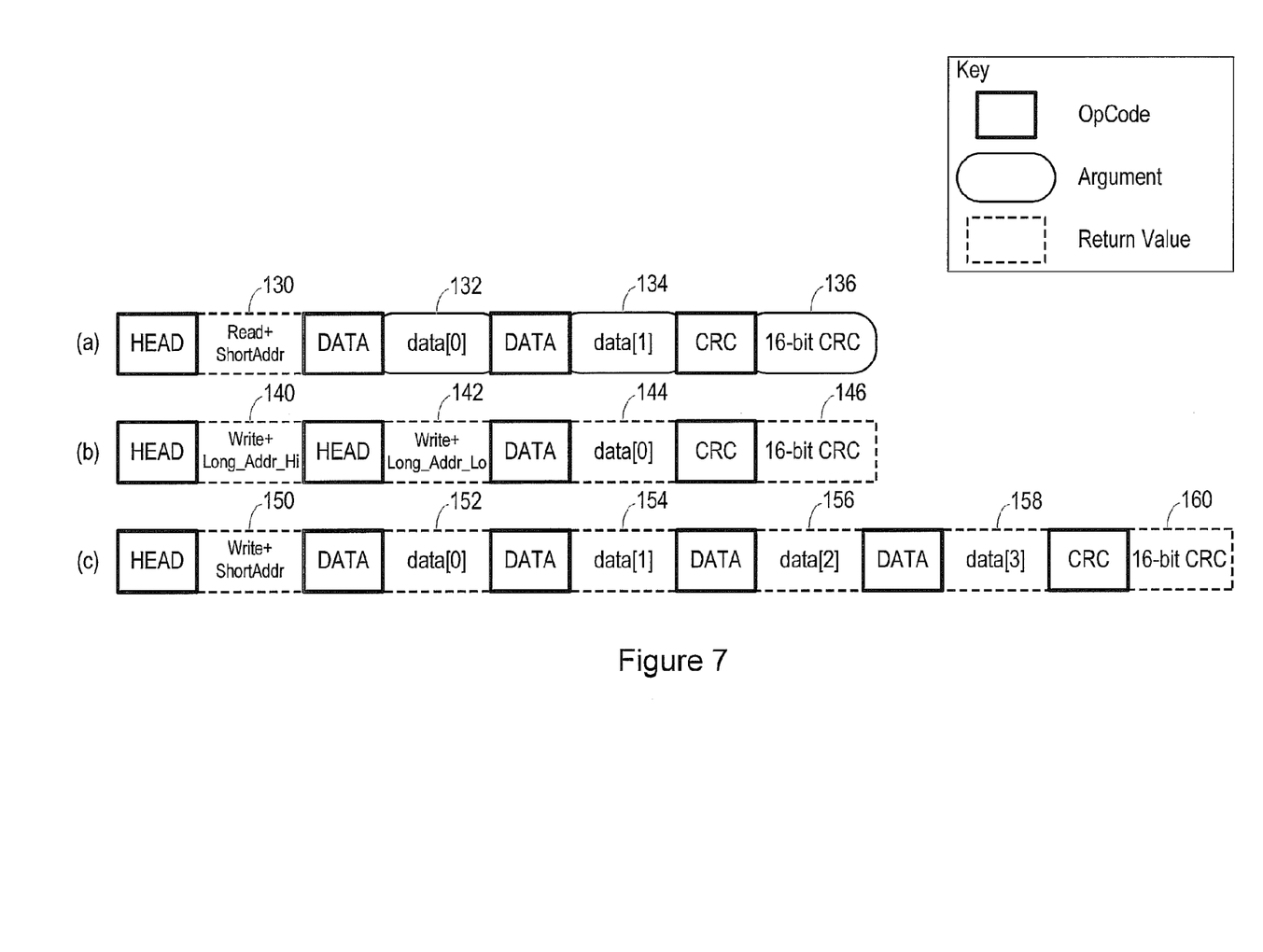
FIG. 7 illustrates example control transactions.

Thus, FIG. 7, view (a) shows a first example of a transaction, in which the first command 130 is a HEADER, with a return value, or parameter, indicating that the transaction will be to read data from a specified address in the slave device. The header format is based on a short address format, fitting in a single parameter. Further commands 132, 134 have the DATA header, with arguments that contain the control data that has been read as commanded. The transaction concludes with a command 136, including a 16 bit CRC of the remainder of the transaction, sent by the slave.

FIG. 7, view (b) shows a second example of a transaction, in which the first and second commands 140, 142 are HEADER commands, indicating that the transaction will be to write data to a specified address in the slave device. The header format is based on a long address format, occupying 2 parameters. There follows a DATA command 144, containing the control data to be written as a return value, or parameter, and the transaction concludes with a command 144, including a 16 bit CRC of the remainder of the transaction, which is sent by the master as this is a write transaction.

FIG. 7, view (c) shows a third example of a transaction, in which the first command 150 is a HEADER, with a return value, or parameter, indicating that the transaction will be to write data to a specified address in the slave device. The header format is based on the short address format, fitting in a single parameter. Further commands 152, 154, 156, 158 have the DATA header, with return values that contain the control data that is to be written as commanded. The transaction concludes with a command 160, including a 16 bit CRC of the remainder of the transaction, sent by the master.

As mentioned above, the frames and rows in each of the devices will be time synchronized, where the synchronization may include slight time offsets reflecting the latency on each path segment in combination with the propagation delay through the respective device. However, these time offsets mean that, when control data is sent from one device to another (for example from a master device to an intermediate device, or from one intermediate device to another intermediate device) in one row, there will be a delay of at least one row before that control data can be sent to another device (namely a further intermediate device or a slave device), to take account of the fact that the subsequent transmission of control data may be in the opposite direction to the previous transmission.

If the start positions of the command slots were synchronized between successive path segments, then this delay of at least one row would mean that, when an intermediate device received control data from a master device or a preceding intermediate device, there would be a delay of the period occupied by one command slot, before that control data could be sent on to the succeeding intermediate device or the slave device. For a path including several path segments, and particularly when the master device sends a command requesting the return of data from the slave device, the accumulated delays over multiple segments can be significant, effectively worsening the response time over the fabric.

In order to reduce these accumulated delays, two control frame formats are used, in which the position of the command slots is offset by at least one row. As mentioned above, these formats are examples of control frames that can be used in the case where: each frame contains 128 rows, each row contains one control bit, and the control frame is synchronized with the frame. There are therefore 128 control bits in each control frame. In other examples, the frame may contain different numbers of rows, each row may contain more than one control bit, and/or the control frame may not be synchronized with the frame. In these other examples, there may be more or fewer than 128 control bits in each control frame.

Figure 8:
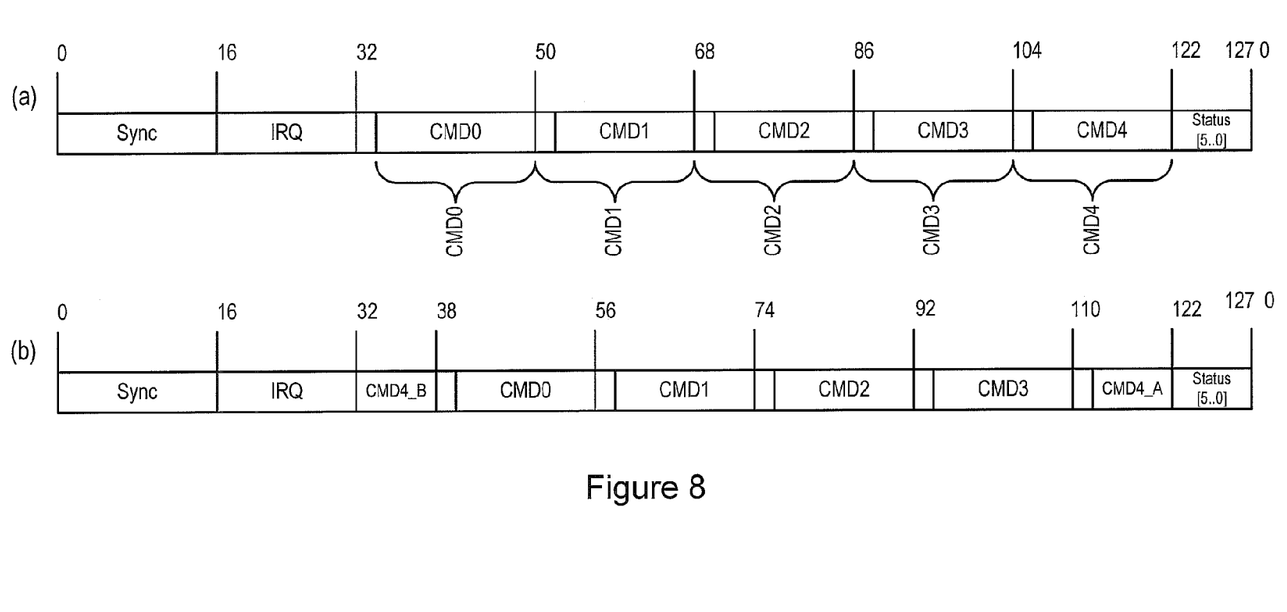
FIG. 8 illustrates example control frame structures.

FIG. 8, view (a) shows a first possible control frame format. In this first possible frame format, control data bit slots 0-15 are reserved for sync bits, control data bit slots 16-31 are reserved for bits representing interrupt requests, a first command slot CMD0 occupies control data bit slots 32-49, a second command slot CMD1 occupies control data bit slots 50-67, a third command slot CMD2 occupies control data bit slots 68-85, a fourth command slot CMD3 occupies control data bit slots 86-103, a fifth command slot CMD4 occupies control data bit slots 104-121, and six status bits occupy control data bit slots 122-127. In each case, the first two bit slots of the command slot are used to transmit the Opcode, as described above. Note that the control frame as displayed here is showing the control data bit slots as part of the control frame. As the control frame is formed by a non-consecutive set of bit slots as part of the frame itself, the individual bit slots of the control frame are not necessarily transferred consecutively.

FIG. 8, view (b) shows a second possible control frame format. In this second possible frame format, control data bit slots 0-15 are reserved for sync bits, control data bit slots 16-31 are reserved for are interrupt request bits, a remaining part CMD4_B of a command slot started during the previous control frame occupies control data bit slots 32-37, a first command slot CMD0 occupies control data bit slots 38-55, a second command slot CMD1 occupies control data bit slots 56-73, a third command slot CMD2 occupies control data bit slots 74-91, a fourth command slot CMD3 occupies control data bit slots 92-109, a first part of a fifth command slot CMD4-A (the remainder of which is transmitted during the subsequent control frame) occupies control data bit slots 110-121, and six status bits occupy control data bit slots 122-127.

Again, the first two bits of each command slot are used to transmit the Opcode, as described above.

Thus, it can be seen that, while the control frames in FIG. 8, view (a) and FIG. 8, view (b) are synchronized in time, the positions of the command slots in the first possible frame format are offset from the positions of the command slots in the second possible frame format.

In the example shown in FIG. 8, there is an offset period of six control data bit slots between the positions of the start of the first command in the two possible frame formats. However, other offsets can be used.

The two possible frame formats are then allocated to the segments, so that they alternate on each path.

Thus, for example in the fabric shown in FIG. 2(*a*), the first possible control frame format can be allocated to the path segments 48 and 56, while the second possible control frame format can be allocated to the path segments 50, 52, 54, 58, 60. The result is that, on each of the paths shown in FIGS. 2(*a*), 2(*b*), 2(*c*) and 2(*d*), the time positions of the command slots on each path segment are offset from the positions of the command slots on each respective adjacent path segment.

Figure 9:
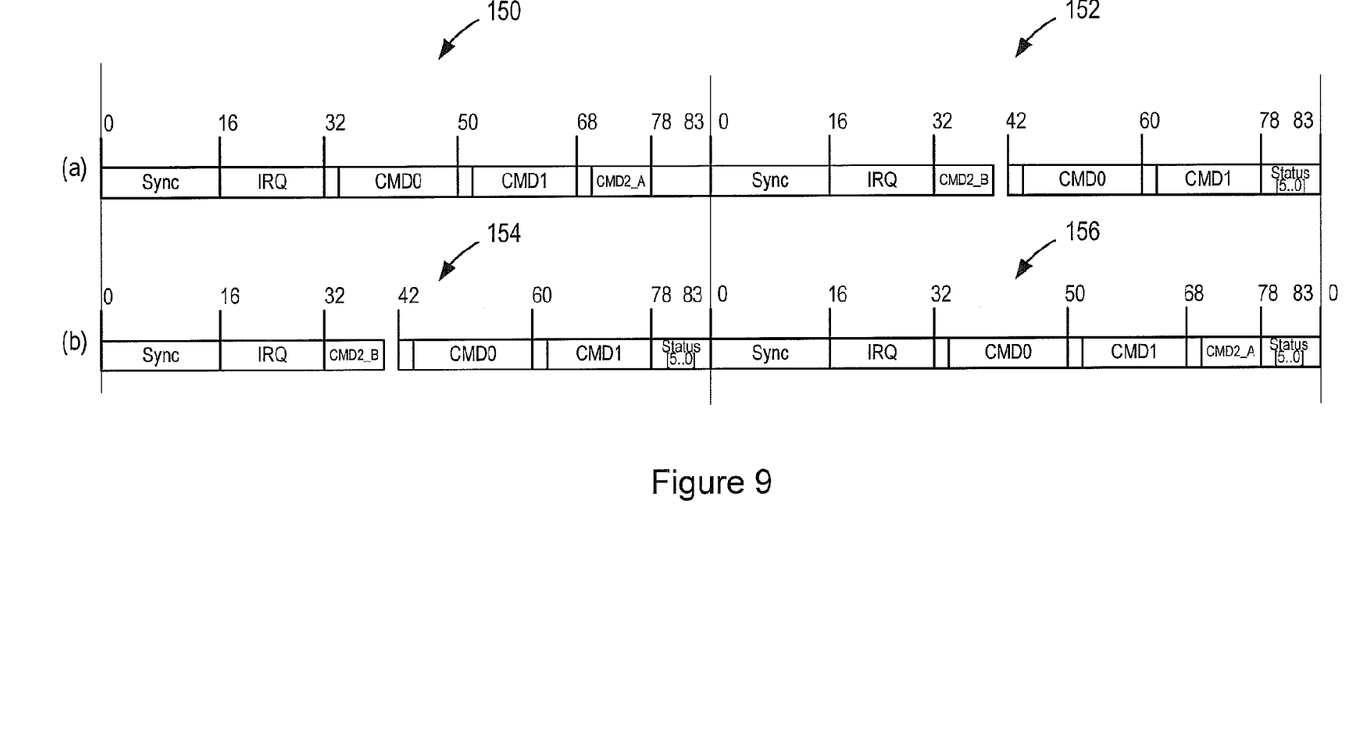
FIG. 9 illustrates further example control frame structures.

FIG. 9 shows two alternative possible control frame formats. Specifically, FIG. 9 shows examples in a situation in which there are 84 control bits in each control frame, for example because each frame contains 84 rows, each row contains one control bit, and the control frame is synchronized with the frame.

FIG. 8 shows an example in which each control frame contains an integer number of command slots. FIG. 9 shows an example in which each frame contains (n+½) command slots, where n represents an integer number.

Thus, FIG. 9 shows an example in which the control frames are considered in pairs. Specifically, FIG. 9, view (a) shows a first possible control frame format 150 immediately followed by a second possible control frame format 152. In the first possible control frame format 150, control data bit slots 0-15 are reserved for sync bits, control data bit slots 16-31 are reserved for are interrupt request bits, a first command slot CMD0 occupies control data bit slots 32-49, a second command slot CMD1 occupies control data bit slots 50-67, a first half CMD2_A of a third command slot occupies control data bit slots 68-77, and six status bits occupy control data bit slots 78-83. In the second possible frame format 152, control data bit slots 0-15 are reserved for sync bits, control data bit slots 16-31 are reserved for are interrupt request bits, a remaining part CMD2_B of the third command slot occupies control data bit slots 32-39, control data bit slots 40 and 41 are unoccupied, a first command slot CMD0 of the new control frame occupies control data bit slots 42-59, a second command slot CMD1 of the new frame occupies control data bit slots 60-77, and six status bits occupy control data bit slots 78-83.

By contrast, FIG. 9, view (b) shows the second possible control frame format 154 immediately followed by the first possible control frame format 156. In the second possible frame format 154, control data bit slots 0-15 are reserved for sync bits, control data bit slots 16-31 are reserved for are interrupt request bits, a remaining part CMD2_B of a command slot from a previous control frame occupies control data bit slots 32-39, control data bit slots 40 and 41 are unoccupied, a first command slot CMD0 occupies control data bit slots 42-59, a second command slot CMD1 occupies control data bit slots 60-77, and six status bits occupy control data bit slots 78-83. In the second possible control frame format 156, control data bit slots 0-15 are reserved for sync bits, control data bit slots 16-31 are reserved for are interrupt request bits, a first command slot CMD0 of the new control frame occupies control data bit slots 32-49, a second command slot CMD1 of the new frame occupies control data bit slots 50-67, a first half CMD2_A of a third command slot occupies control data bit slots 68-77, and six status bits occupy control data bit slots 78-83.

The two possible frame formats are then alternated between consecutive path segments, with the arrangements shown in FIG. 9, view (a) and FIG. 9, view (b) alternating on each path.

Thus, for example in the fabric shown in FIG. 2(*a*), the arrangement shown in FIG. 9, view (a) can be allocated to the path segments 48 and 56, while the arrangement shown in FIG. 9, view (b) can be allocated to the path segments 50, 52, 54, 58, 60. The result is that, on each of the paths shown in FIGS. 2(*a*), 2(*b*), 2(*c*) and 2(*d*), the time positions of the command slots on each path segment are offset from the positions of the command slots on each respective adjacent path segment.

This alternation, as described with reference to FIGS. 8 and 9, has the effect that, on any path from an ultimate master device to an ultimate slave device, the positions of the command slots on each path segment are offset from the positions of the command slots on each adjacent path segment.

This means that the delays in sending control data through the fabric can be reduced. As an example, it was mentioned above that, if the start positions of the command slots were synchronized between successive path segments, then, when an intermediate device received control data from a master device or a preceding intermediate device, there would be a delay of the period occupied by one command slot, before that control data could be sent on to the succeeding intermediate device or the slave device. In a path comprising a master, two intermediate devices, and a slave, and therefore having three path segments, there would be a first delay of one period before the first intermediate device could send on to the second intermediate device the data that it had received from the master device, and there would be a second delay of one period before the second intermediate device could send on to the slave device the data that it had received from the first intermediate device. Thus, the total delay is equal to the period occupied by two command slots.

However, by alternating the positions of the command slots on adjacent path segments, these delays are reduced. In a path comprising a master, two intermediate devices, and a slave, and therefore having three path segments, there would be a first delay before the first intermediate device could send on to the second intermediate device the data that it had received from the master device, and there would be a second delay before the second intermediate device could send on to the slave device the data that it had received from the first intermediate device. However, the first delay would be equal to the offset duration, while the second delay would be an offset duration shorter than the period occupied by one command slot. Thus, the total delay is equal to the period occupied by one command slot, that is, half of the delay in the previous example.

The invention claimed is:

1. A method of transferring control data between a master device and a slave device over a path including at least one intermediate device, such that the path includes multiple path segments between successive pairs of devices, the method comprising:
  transferring data on each path segment in a plurality of frames of data, wherein the frames are synchronized between said path segments;
  transmitting the control data in command slots of each frame, wherein a command slot comprises a set of control data bit slots, and wherein a control data bit slot is a time window associated with the transfer of a single control data bit over a single path segment between the devices on the path segment;
  wherein the control data bit slots for each command slot are subdivided into:
    a first set of bit slots reserved for the transfer of control data in the direction from the master device to the slave device, and
    a second set of bit slots reserved for the transfer of control data either in the direction from the master device to the slave device or in the direction from the slave device to the master device; and
  wherein the time positions of the command slots on each path segment are offset from the positions of the command slots on each respective adjacent path segment by at least one control data bit slot.

2. A method as claimed in claim 1, wherein each frame of data contains a plurality of rows, and wherein each row contains at least one control data bit slot.

3. A method as claimed in claim 1, wherein the control data bit slots of a frame form an integer number of command slots.

4. A method as claimed in claim 1, wherein the control data bit slots of a frame form (n+½) command slots, where n is an integer number.

5. A method as claimed in claim 1, wherein, of each pair of adjacent path segments, devices linked by a first path segment operate with a first arrangement of command slots in each frame, and devices linked by a second path segment operate with a second arrangement of command slots in each frame.

6. A method as claimed in claim 1, wherein, of each pair of adjacent path segments, devices linked by a first path segment operate with first and second arrangements of command slots in respective first and second frames, and devices linked by a second path segment operate with the second and the first arrangements of command slots in the respective first and second frames.

7. A system, comprising a master device and a slave device connected by a path including at least one intermediate device, such that the path includes multiple path segments between successive pairs of devices, the system being adapted to transfer control data between the master device and the slave device by:
  transferring data on each path segment in a plurality of frames of data, wherein the frames are synchronized between said path segments;
  transmitting the control data in command slots of each frame, wherein a command slot comprises a set of control data bit slots, and wherein a control data bit slot is a time window associated with the transfer of a single control data bit over a single path segment between the devices on the path segment;
  wherein the control data bit slots for each command slot are subdivided into:
    a first set of bit slots reserved for the transfer of control data in the direction from the master device to the slave device, and
    a second set of bit slots reserved for the transfer of control data either in the direction from the master device to the slave device or in the direction from the slave device to the master device; and
  wherein the time positions of the command slots on each path segment are offset from the positions of the command slots on each respective adjacent path segment by at least one control data bit slot.

8. A system as claimed in claim 7, wherein each frame of data contains a plurality of rows, and wherein each row contains at least one control data bit slot.

9. A system as claimed in claim 7 or 8, wherein the control data bit slots of a frame form an integer number of command slots.

10. A system as claimed in claim 7, wherein the control data bit slots of a frame form (n+½) command slots, where n is an integer number.

11. A system as claimed in claim 7, wherein, of each pair of adjacent path segments, devices linked by a first path segment operate with a first arrangement of command slots in each frame, and devices linked by a second path segment operate with a second arrangement of command slots in each frame.

12. A system as claimed in claim 7, wherein, of each pair of adjacent path segments, devices linked by a first path segment operate with first and second arrangements of command slots in respective first and second frames, and devices linked by a second path segment operate with the second and the first arrangements of command slots in the respective first and second frames.

13. A system as claimed in claim 7, wherein the system comprises an audio system, configured for also transferring audio data between the master device and the slave device.

14. A system as claimed in claim 7, wherein the system comprises a laptop computer, notebook or tablet computer, smartphone, games console, television set, in-car entertainment system or home cinema system.

15. An intermediate device, for transferring control data between a master device and a slave device over a path including at least one such intermediate device, such that the path includes multiple path segments between successive pairs of devices, wherein:
  data is transferred on each path segment in a plurality of frames of data, wherein the frames are synchronized between said path segments;
  the control data is transmitted in command slots of each frame, wherein a command slot comprises a set of control data bit slots, and wherein a control data bit slot is a time window associated with the transfer of a single control data bit over a single path segment between the devices on the path segment; and
  wherein the control data bit slots for each command slot are subdivided into:
    a first set of bit slots reserved for the transfer of control data in the direction from the master device to the slave device, and
    a second set of bit slots reserved for the transfer of control data either in the direction from the master device to the slave device or in the direction from the slave device to the master device;
  the device comprising first and second interfaces for connection to respective first and second path segments, configured such that the respective time positions of the command slots on the first and second path segments are offset from each other by at least one control data bit slot.

16. An intermediate device as claimed in claim 15, wherein the intermediate device is a switch.

17. An intermediate device as claimed in claim 15, wherein the intermediate device is a repeater.

* * * * *